United States Patent Office 3,032,439
Patented May 1, 1962

3,032,439
COMPOSITIONS BASED ON UNSATURATED ORGANOSILICON COMPOUNDS USED FOR COATING GLASS SURFACES
Robert Müller, Bonn, Paul Buchheit, Burghausen, and Siegfried Nitzsche, Bavaria, Germany, assignors to Wacker-Chemie G.m.b.H., Munich, Germany
No Drawing. Filed Dec. 23, 1959, Ser. No. 861,465
Claims priority, application Germany Dec. 27, 1958
8 Claims. (Cl. 117—124)

This invention relates to organosilicon materials particularly useful as glass coating agents.

A simplified flow diagram of the process is as follows:

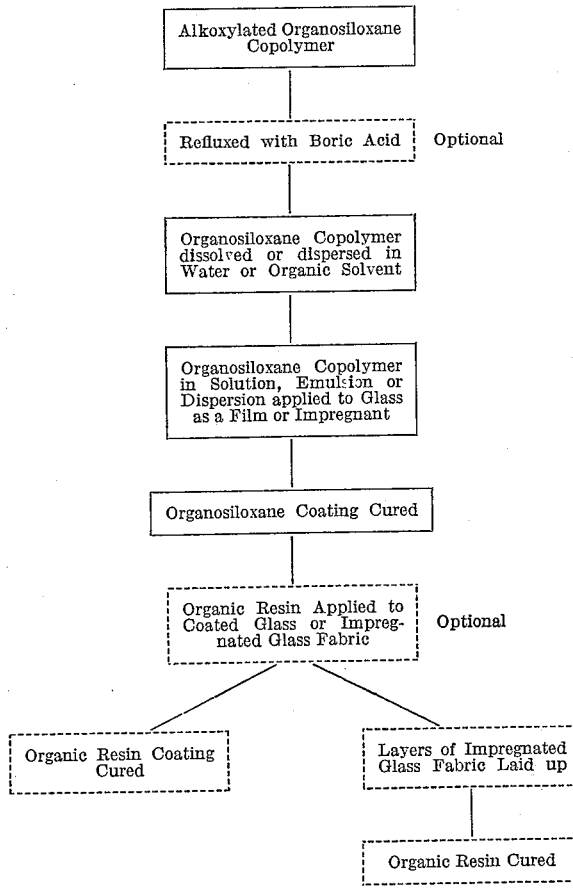

It is known that glass materials, including plate glass and glass fibers, can be pretreated with silanes or siloxanes to improve the adherence of organic resins thereto. The pretreatment with organosilicon materials provides a thin film 1 to 10 molecules in depth on the glass surface. The adhesion of organic resins to glass is improved by the pretreatment.

The most useful organosilicon materials for the pretreatment of glass as described above are silanes and siloxanes having some unsaturated organic substituents such as vinyl, allyl and cyclohexenyl radicals. The pretreatment with such silanes and siloxanes heretofore employed resulted in marked improvement in chemical and physical resistance of the bond between organic resin and the glass surface. Nevertheless, the adhesion of polyester resins to the pretreated glass surface remains unstable to the influence of heat and water or water vapor. Furthermore, the pretreated glass surface is not easily wet by the organic resins due to the known incompatibility between siloxane films and organic resins. Thus polyester resins will not form an even, thin coating on a pretreated glass surface. The organic resin film will shrink into droplets or islands of resin leaving large areas of glass surface uncoated.

The object of the present invention is to introduce a novel organosilicon coating material for pretreating glass surfaces to secure good adhesion of organic resin coatings to the glass. Another object is to employ a method of pretreating glass whereby a subsequent coating of polyester resin will exhibit excellent adhesion to the glass surface as well as resistance to heat and water, even boiling water. A further object is a pretreatment for glass which will permit the application of thin films of polyester resin, completely coating the glass surface. Other objects and advantages of this invention are disclosed in or will be apparent from the disclosure and claims of the instant application.

The organosilicon materials of this invention are alkoxylated organopolysiloxane copolymers containing (a) 20 to 50 percent by weight of units of the general formula $$R_n Si(OR')_x O_{\frac{4-n-x}{2}}$$

(b) 20 to 50 percent by weight of units of the general formula $$R^2_m R_r Si(OR')_x O_{\frac{4-m-r-x}{2}}$$

and (c) 10 to 40 percent by weight of units of the general formula $$R^3 O R^4 Si(OR')_x O_{\frac{3-x}{2}}$$

where each R is an alkyl radical, each R' is an alkyl radical of less than 7 carbon atoms, $R^2$ is an unsaturated aliphatic or cycloaliphatic hydrocarbon radical, $R^3$ is a hydrogen atom or an acyl radical of a monobasic organic aliphatic acid of less than 7 carbon atoms, $R^4$ is a bivalent hydrocarbon radical, $n$ and $m$ have an average value of 1 to 2 inclusive, $r$ has an average value of 0 to 1 inclusive and $x$ has an average value of 0.5 to 1.5 inclusive, the sum of $m+r+x$ being less than 4.

The polymers of this invention are copolymers of the three types of defined units. In the defined units, the radicals represented by R are alkyl radicals such as methyl, ethyl, propyl, butyl and nonyl; the radicals represented by R' are alkyl radicals of less than 7 carbon atoms such as methyl, ethyl and butyl; $R^2$ represents alkenyl or cycloalkenyl radicals such as vinyl, allyl and cyclohexenyl radicals; $R^3$ represents hydrogen atoms or acyl radicals of less than 7 carbon atoms such as formyl, acetyl, propionyl and butyryl and $R^4$ represents a bivalent hydrocarbon radical such as methylene, ethylene and phenylene.

The polymers disclosed herein can best be prepared by alcoholysis followed by hydrolysis and condensation of the corresponding silanes, particularly halosilanes. A mixture of the desired proportions of the appropriate chlorosilanes such as $R_n SiCl_{4-n}$, $R^2_m R_r SiCl_{4-m-r}$ and $R^3 O R^4 SiCl_3$ is dissolved in an inert organic solvent such as toluene, benzene, xylene or petroleum ether with or without a polar organic solvent such as an ester or an ether. A simple alkyl alcohol of 1 to 6 carbon atoms such as methyl alcohol or butyl alcohol is added in dropwise fashion in such proportion to replace some of the chlorine atoms on the silanes with alkoxy groups. The replacement of chlorine atoms with alkoxy substituents on the silicon atoms should be such that after the alcohol has been added the silane mixture will contain .5 to 1.5 alkoxy substituents per silicon atom. Following the alcoholysis, the silane is hydrolyzed by adding water thereto and the by-product hydrogenhalide is neutralized by washing or with an aqueous salt solution.

The siloxane oil is separated from the water by any desired means and the solvent is distilled off. The resulting product is the organosiloxane employed herein to treat glass.

In the method outlined supra for preparing the siloxanes employed herein, the starting silane of the formula $R^4OR^3SiCl_3$ can be prepared by the addition of the vinyl ester to silicochloroform such as the addition of vinyl acetate to $HSiCl_3$ to produce the compound $CH_3COOCH_2CH_2SiCl_3$.

It is to be noted that when the $R^4O—$ group in the silane precursor of the (c) units herein is attached to a carbon atom alpha or beta to the silicon, e.g.

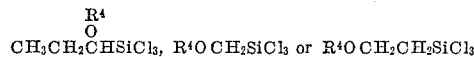

the hydrolysis of the mixture of silanes should be carried out at temperatures of 10° C. or lower. At such temperatures the $R^4O—$ group remains intact and is not split off the $R^4OR^3Si\equiv$ group.

The siloxane copolymers of this invention can be dissolved in organic solvents, emulsified in water and dissolved in minor proportions in water. The organic solvent solution, emulsion or water solution can be heated and catalytic amounts of boric acid added thereto to produce clear solutions which form tack-free films at temperatures below 100° C. after evaporation of the organic solvent or water.

Organic solvent solutions or aqueous emulsions of the siloxanes of this invention can be applied to glass by brushing, spraying, dipping, flowing or any other desired means. Generally, emulsions containing 0.1 percent to 1.0 percent by weight siloxane give excellent results. The coated glass is heated to 50° to 100° C. to hasten the evaporation of the organic solvent or water carrier and cure the film. The glass so treated can then be coated with organic resins and particularly polyester resins. Any polyester resin can be coated in smooth even films on the pretreated glass surfaces. Particularly useful are those resins categorized at pages 221 and 224 of "The Chemistry of Commercial Plastics" by R. L. Wakeman, published by Reinhold Publishing Corporation in 1947.

The glass treated in accordance with this invention can be in any desired form including plates, fibers or formed glass such as containers. The treated glass exhibits a smoother surface than untreated glass. Thus glass fibers and glass cloth are smoothed by the process of this invention. The glass to be treated can be alkali-free or alkali-containing thus contributing to the wide applicability of the materials of this invention.

The following examples are included herein to aid in understanding this invention. The scope of the invention is not limited by the examples but is adequately delineated in the claims. All parts and percentages in the examples are based on weight unless otherwise specified and all viscosities are at 25° C.

*Example 1*

A mixture of 35 parts $CH_3SiCl_3$, 40 parts $CH_2=CHSiCl_3$, 20 parts $CH_3COOCH_2CH_2SiCl_3$ and 5 parts $(CH_3)_2SiCl_2$ was dissolved in 150 parts benzene and 50 parts ethyl acetate. Dropwise addition of 72 parts ethyl alcohol to the above mixture was carried forward with stirring and cooling. The reaction mixture was cooled to the range 0° to 10° C. and while at this temperature 22 parts of water were added. The solution was poured on cracked ice and the water layer separated from the organic solvent solution of product. The solution was washed to neutrality with an aqueous solution of sodium bicarbonate. The organic solvent was distilled off and a viscous, colorless alkoxylated organosiloxane oil was obtained.

The alkoxylated organosiloxane oil prepared above was dissolved in toluene to give a 50 percent solids solution. The solution was heated to reflux with 3 percent by weight boric acid and was refluxed and stirred for 25 minutes to 120° C. The resulting solution was applied to glass by dipping and cured to a tack-free, cohesive film which did not crack or discolor when heated to 200° C., and remained intact even when boiled in water.

The treated glass surface was further coated with an unsaturated polyester resin having a styrene content of 35 percent and an acid count of 30 and containing 1 percent of benzoyl peroxide. A thin continuous cohesive film of resin resulted and after curing at 120° C. for one hour, the resin film was firmly and evenly adherent to the glass surface. The coated glass was boiled in tap water for 3 hours without in any way affecting the film.

For purposes of comparison, three different siloxane copolymers in accordance with the prior art were prepared by the method outlined above. Siloxane A was prepared from 90 ml. of vinyltrichlorosilane ($CH_2=CHSiCl_3$), and 10 ml. of vinylmethyldichlorosilane $[CH_2=CH(CH_3)SiCl_2]$; siloxane B, from 50 ml. $CH_2=CHSiCl_3$ and 50 ml. $CH_3SiCl_3$; and siloxane C, from 50 ml. $CH_3SiCl_3$ and 50 ml. of $CH_3COOCH_2SiCl_3$. Glass samples were coated by dipping in the three siloxanes. The films were cured as above.

The glass coated with siloxane A was heated to 150° C. and the siloxane film cracked. The siloxane film could be slowly removed from the glass by running cold water over the surface. The siloxane film was rapidly removed with boiling water.

The glass coated with siloxane B was placed in boiling water and the film was removed in 30 minutes. Furthermore a polyester coating on the glass coated with siloxane B formed islands on the glass surface resulting in thick splotches of polyester resin with thinly covered areas or totally uncovered areas between the splotches. The polyester film did not adhere firmly to the glass pretreated with siloxane B and was easily removed in boiling water.

The glass coated with a film of siloxane C was heated to 120° C. at which point the film turned brown. The film hardened unevenly and poorly. The glass treated with siloxane C resisted subsequent coating with polyester resins and the polyester resin did not adhere as well to glass treated with siloxane C as it did to untreated glass.

*Example 2*

The viscous, colorless alkoxylated organosiloxane oil prepared in Example 1 was employed to prepare an aqueous solution containing 0.5 percent of said organosiloxane oil. The solution was heated to reflux with a catalytic amount of boric acid. Unsized glass cloth was dipped into this solution and the excess water allowed to drip off the cloth. The cloth was then air dried at 100° C. and was found to have picked up .8 percent of its weight of the siloxane solids. The treated cloth had a beautiful gloss, an excellent hand and the individual fibers of the cloth did not adhere to each other.

*Example 3*

30 parts of methyltrichlorosilane, 30 parts of vinyltrichlorosilane and 40 parts of β-acetoxyethyl-trichlorosilane were dissolved in 150 parts of benzene and 50 parts of ethyl acetate. Hereafter 71 parts of ethanol and, while cooling the mass below 10° C., 22 parts of water were added. The reaction mixture was poured on 300 parts of ice, the organic solvent solution of product separated from the water layer and was washed five times with 5 percent sodium bicarbonate solution. After distillation of the solvent the product was dissolved in the same amount of toluene, the solution was mixed with 1 part of boric acid and was refluxed while stirring for 15 minutes.

This solution was applied to a glass surface and a clear, hard film was obtained which, however, was not quite so resistant against water as the film obtained according to Example 1.

Example 4

40 parts of methyltrichlorosilane, 40 parts of vinyltrichlorosilane and 20 parts of β-acetoxyethyl-trichlorosilane were dissolved in 250 parts of benzene and 100 parts of butyl acetate and 115 parts of n-butanol were slowly added under stirring. Then 25 parts of water were added while cooling the mass below 10° C., and the mixture was placed on 1000 parts of ice. After separating the organic solvent solution of the product from the water layer, it was washed with 5 percent bicarbonate solution until it tested neutral. After the distillation of the solvent the residue was introduced into the same amount of toluene and was treated for 45 minutes at reflux temperature with 3 percent by weight of boric acid.

The film formed by this solution is tack-free, but somewhat softer and more flexible than the films obtained according to Examples 1 and 3. The resistance against water was excellent.

Example 5

Heat-cleaned glass fabric was treated, as described in Example 2, with 1 percent aqueous emulsions of the resin solutions according to Examples 1, 3 and 4. Using this glass fabric and three different commercial unsaturated polyester resins, laminated bodies were produced by molding twelve layers of the glass fabric impregnated with resin that had been catalyzed with 1 percent of benzoyl peroxide, 20 minutes at 100° C. These laminated bodies were compared to samples manufactured from untreated glass fabric and the same unsaturated polyester resins. All laminated bodies prepared from the glass fabric treated according to the invention were superior to the comparative samples regarding the mechanical properties and resistance against water.

Example 6

When employing methanol, propanol or butanol in place of the ethyl alcohol in Example 1, the results obtained were similar.

Example 7

When Example 3 was repeated employing $C_2H_5SiCl_3$, $C_4H_9SiCl_3$ or $C_5H_{11}SiCl_3$ in place of the methyltrichlorosilane; allyltrichlorosilane, cyclohexyltrichlorosilane or vinylmethyldichlorosilane in place of the vinyltrichlorosilane; and acetoxyphenyltrichlorosilane, an acetoxypropyltrichlorosilane or an hydroxyalkyltrichlorosilane such as hydroxymethyl-or hydroxybutyltrichlorosilane in place of the β-acetoxyethyltrichlorosilane, excellent films were obtained on glass.

That which is claimed is:

1. A copolymeric alkoxylated organosiloxane consisting essentially of (a) 20 to 50 percent by weight of units of the general formula $$R_nSi(OR')_xO_{\frac{4-n-x}{2}}$$

(b) 20 to 50 percent by weight of units of the general formula $$R^2{}_mR_rSi(OR')_xO_{\frac{4-m-r-x}{2}}$$

and (c) 10 to 40 percent by weight of units of the general formula $$R^3OR^4Si(OR')_xO_{\frac{3-x}{2}}$$

where each R is an alkyl radical, each $R_2$ is an alkyl radical of less than 7 carbon atoms, each $R^2$ is an unsaturated organic radical selected from the group consisting of unsaturated monovalent aliphatic hydrocarbon radicals and unsaturated monovalent cycloaliphatic hydrocarbon radicals, $R^3$ represents substituents selected from the group consisting of hydrogen atom and acyl radicals of monobasic organic aliphatic acids of less than 7 carbon atoms, $R^4$ is a bivalent hydrocarbon radical, $n$ and $m$ have an average value of from 1 to 2 inclusive, $r$ has an average value of from 0 to 1 inclusive, and $x$ has an average value of from 0.5 to 1.5 inclusive.

2. A copolymer in accordance with claim 1 wherein each R is a methyl radical.

3. A copolymer in accordance with claim 2 wherein the $R^3O$— substituent is attached to a carbon atom closer to the silicon atom than the gamma position and the corresponding silane is prepared by hydrolysis at a temperature below 10° C.

4. A method of coating glass consisting essentially of applying thereto a film of the alkoxylated organosiloxane copolymer of claim 3 and thereafter curing the film.

5. A method of coating glass consisting essentially of applying thereto a film of the alkoxylated organosiloxane copolymer of claim 1 and thereafter curing the film.

6. Glass coated in accordance with claim 5.

7. A glass coating composition prepared by heating a solution of the copolymeric alkoxylated organosiloxane of claim 1 and a catalytic amount of boric acid to reflux.

8. A method of coating glass consisting essentially of applying thereto a film of the alkoxylated organosiloxane copolymer of claim 1, curing the film and thereafter applying an organic resin to the cured siloxane film.

References Cited in the file of this patent

UNITED STATES PATENTS

| | | |
|---|---|---|
| 2,891,885 | Brooks | June 23, 1959 |
| 2,925,402 | Speier | Feb. 16, 1960 |

UNITED STATES PATENT OFFICE
CERTIFICATE OF CORRECTION

May 1, 1962

Patent No. 3,032,439

Robert Müller et al.

It is hereby certified that error appears in the above numbered patent requiring correction and that the said Letters Patent should read as corrected below.

Column 4, line 21, for "$CH_3COOCH_2SiCl_3$" read -- $CH_3COOCH_2CH_2SiCl_3$ --; column 6, line 14, for "$R_2$" read -- $R'$ --.

Signed and sealed this 20th day of November 1962.

(SEAL)
Attest:

ERNEST W. SWIDER
Attesting Officer

DAVID L. LADD
Commissioner of Patents